United States Patent Office 3,124,510
Patented Mar. 10, 1964

3,124,510
STABLE DRY POWDERED FAT-SOLUBLE VITAMINS
Adolf Rosenberg, Forest Hills, N.Y., assignor to Commercial Solvents Corporation, a corporation of Maryland
No Drawing. Filed Apr. 26, 1960, Ser. No. 24,653
8 Claims. (Cl. 167—81)

This invention relates to fat-soluble vitamins. More particularly, it is directed to dry fat-soluble vitamins, especially vitamin A in tiny beadlet form. With greater particularity, it is directed to vitamin A (including other fat-soluble vitamins, D. E and K, such as are similarly used in this art) in the aforesaid form, which are characterized by ready miscibility with water. Such products are useful as a source of the fat-soluble vitamins in feeds, foods and other products.

In my pending application Serial No. 836,857, filed August 31, 1959, I have pointed out that dry vitamin A feed supplements, which may also include other fat-soluble vitamins, are useful in preparing emulsion feeds employed in animal husbandry, and that they are also useful in providing the fat-soluble vitamin components of feeds in pellet form. In said pending application I have reviewed the various proposals heretofore made with respect to the composition and method of manufacturing such vitamin A products. I pointed out that important considerations have always been the stability of the labile vitamins during storage, as well as the prevention of loss of vitamin potency during manufacture of the products.

As is well known, vitamin A is particularly sensitive to oxidative or other destructive forces, and in consequence a great deal of attention and investigation has been devoted to the problem of providing water-miscible vitamin products which will have a high content of vitamin A and which will be stable during storage. In my pending application aforesaid, I have reviewed proposals typified by Taylor—U.S. Patent No. 2,183,053
Caldwell—U.S. Patent No. 2,562,840
Wallenmeyer—U.S. Patent No. 2,650,895
Goett—Canadian Patent No. 531,876
Cannalonger—U.S. Patent No. 2,756,177

I pointed out that Taylor employed gelatin as the vehicular material for vitamin A-bearing material and that Taylor subsequently found that—if the vitamin A-bearing oil is dispersed in pure gelatin—the gelatin of such gelatin beadlets became insoluble in water. Taylor, in a later patent, No. 2,218,592, taught the manufacture of water-soluble beadlets in which the vehicular material consists of gelatin plasticized with a very substantial amount of honey or invert sugar.

Caldwell (supra) sets forth another means to overcome the disadvantages of gelatin alone as vehicular material for beadlets of the class described. I also pointed out that the art had found disadvantages in the products made by spray-drying aqueous slurries to produce vitamin A in beadlet form, and that the processes of the other patents above mentioned employed techniques other than spray-drying in order to obtain products which were not marked by the disadvantages of those mentioned.

Iacano et al., Canadian Patent No. 560,407, describes the manufacture of water-soluble beadlets containing vitamin A in which the vehicular material is milk solids not fat. An aqueous slurry is formed from the milk solids not fat, a low-melting fat, vitamin A, anti-oxidants and, as a synergist for the anti-oxidant, lecithine. The slurry is spray-dried. The product has a relatively low unitage of vitamin A (of the order of approximately 10,000 units per gram). The fat content is of the order of that present in milk. This product suffers from the same defects as does dry whole milk. It is known that the fat phase of dry whole milk is readily susceptible to oxidation.

In my pending application aforesaid, I have set forth that the art has generally shunned the spray-drying of aqueous emulsions to produce vitamin A-containing tiny beadlets or powders and has also shunned spray-drying of gelatin-based products of this class. I have pointed out that gelatin has certain desirable characteristics, in that it forms good films, and that, as mentioned above, when gelatin constituted the principal vehicular material, it underwent change with a resultant loss in solubility of the beadlets.

In my pending application aforesaid, I have described my discovery that gelatin can be employed as a component of the vehicular material for fat-soluble vitamins, particularly vitamin A, when manufactured by the spray-drying technique. I have shown in said pending application that, upon homogenizing an aqueous slurry of gelatin and milk solids not fat, an oil containing a high concentration of vitamin A-active material, as for example a fish oil having a high concentration of vitamin A and an oil containing a high concentration of synthetic vitamin A, such homogenizate can be spray-dried to produce a powdery material leaving the minute oil droplets encased in the shell material mentioned. The combination of the gelatin and the mixture of proteins and carbohydrates of the milk solids not fat constitute the vehicular material for the vitamin-bearing oil imprisoned within the tiny beads.

I have now discovered that I can, by the same technique as that described in my aforesaid pending application, accomplish the spray-drying of an aqueous homogenizate, whereof the principal components are gelatin, milk solids not fat hereinafter referred to as skim milk solids, e.g., powdered skim milk, a normally solid fat having a melting point ranging from 35 to 70° C. and vitamin A. In the manufacture of the product by spray-drying of such homogenizate, the vitamin A does not undergo destruction; and the product obtained is characterized by the stability of the vitamin A to an even higher extent than in the product of my pending application.

Among the advantages of the products obtainable in accordance with this discovery are the greater hardness of the beadlets or powder, so that the oil-dissolved vitamin content thereof does not leak out. They can withstand the high pressures encountered in tableting or pelletizing, when these powders constitute the source of the vitamin A component for pelletized or tableted feeds or other purposes. In carrying out the manufacture of the beadlets of the instant invention, the technique parallels that of my pending application aforesaid. However, in place of the oil alone which contains the fat-soluble vitamin, I now employ a hard fat along with the vitamin A or provitamin A, as for example, a vitamin A oil having a high vitamin A potency.

Accordingly, it is one of the principal objects of the present invention to provide water-soluble or water-dispersible tiny beadlets or powders containing a very high potency of vitamin A, which are manufactured by spray-drying; and whereof gelatin is an important and substantial constituent of the vehicular material, the beadlets or powders being characterized by a substantial content of a high-melting point edible fat.

In carrying out the manufacture of the tiny beadlets, i.e., the powder in accordance with this invention, a mixture is prepared from water, a fat having a melting point, e.g., from 35 to 75° C. an oil or other suitable material containing one or more of the fat-soluble vitamins A, D, E, K, natural or synthetic, or provitamins (such as are customarily used in this art), as for example, an oil containing a high concentration of vitamin A (which may be as high as one million or more units per gram) or an oil containing high concentrations of vitamins A and D or vitamins A, E, D, and K, the gelatin and the skim milk solids. The mixture is subjected to homogenization, and the homogenizate is atomized in a spray-drier.

The solids content, i.e., the non-aqueous content of the mixture, can range from 30% to as high as 70%, preferably about 45%, so that the material can be readily homogenized.

The fat portion, i.e., fat, oil and oil soluble components, of the total solids can constitute about 20 to 80% of the total solids, suitably about 30 to 50%, and preferably about 40%. Accordingly, the beadlets made therefrom will have a fat portion of about 20 to 80%, suitably about 30 to 50%, and preferably about 40%.

The non-fat vehicular material, i.e., the combination of gelatin and skim milk solids can have a gelatin content of about 10% to 80%, preferably about 30 to 60% of said non-fat vehicular material.

It will be understood, of course, that the beadlets can include one or more of the well-known anti-oxidants customarily employed in this art, as well as one or more of the well-known sequestering agents customarily employed for the fixation of trace metals, such as for example iron, copper, etc. The anti-oxidants can constitute up to approximately 1.5% of the beadlets and the sequestering agents up to about 0.8% of the beadlets. Typical of the customary anti-oxidants are: butylated hydroxy-anisol (BHA), butylated hydroxy-toluene (BHT), propyl-gallate, nordihydroguaiaretic (NDGA), Santoquin, 1,2-dihydro-6-ethoxy-2,2,4-trimethyl quinoline.

The metal sequestering agents, which may be used, are for example, citric acid, lecithin, ethylene-diamine-tetraacetic acid, the customary salts thereof, e.g., the sodium salts, etc.

Accordingly, the mixture from which the homogenizate is prepared can include the anti-oxidants and/or sequestering materials in amounts proportioned to the content of the vehicular material combination and the fat content to provide the desired quantities of the ingredients disposed in the fat or non-fat portion of the final dry product.

It will be understood, of course, that it is advantageous in effecting the mixture of the ingredients to carry out such operation under an inert gas, as for example, a blanket of nitrogen or carbon dioxide. The percentages of the materials set forth above and in the subsequent examples are by weight.

The following are examples in accordance with the invention:

*Example 1*

55 parts of water, desirably distilled or ion free, having a temperature of 200° F., are charged into a mixing tank. There are added thereto 20 parts of gelatin, 35 parts of low-heat skim milk powder. If desired, there may be included 1 to 2 parts of a sequestering agent, as for example the sodium salt of ethylene-diamine-tetraacetic acid.

In a separate vessel, 27.5 parts of edible tallow (melting point, e.g. 58° C.) are heated to a temperature of 190° F. and 17.5 parts of a vitamin A-bearing oil having a vitamin A content of 600,000 units per gram are incorporated in the molten fat. Also included is a mixture of propyl gellate, butylated hydroxyanisole and butylated hydroxy-toluene in an amount of 1.2%, based on the solids.

The two fluid masses are thoroughly mixed, preferably under an inert gas such as carbon dioxide or nitrogen, and then homogenized, using a homogenizer such as that employed in the homogenization of milk. The homogenizate is sent to a direct-heat spray-drier. The spray-drier is operated at an inlet temperature of from 350 to 450° F., the ambient dry-bulb temperature being 200–240° F.

The spray-dried powdered product is obtained in an amount which virtually is the same as that of the non-aqueous content of the homogenizate fed to the spray-drier. The vitamin A content of the obtained powder is 105,000 units per gram, showing that no loss of vitamin A occurred during processing.

The obtained product is subjected to an accelerated holding test by storage at 45° C. Assay of the product subjected to such tests shows at the end of 6 days and 14 days respectively, complete retention of the vitamin A content.

In another test of the product, it is mixed in an amount of 10% by weight with a feed premix containing a high amount of minerals and other ingredients, the minerals being copper sulfate, iron sulfate, manganese sulfate and zinc sulfate. In an accelerated holding test, carried out at 45° C., the product shows at the end of 14 days virtually complete retention of the vitamin A content.

*Example 2*

In accordance with the general procedure described in Example 1, a homogenizate is prepared from 60 parts of water, 24 parts of a mixture of fat having a melting point of 55–65° C. and a vitamin-bearing oil (corn oil containing synthetic vitamin A) having a vitamin content of 600,000 units per gram, the ratio of fat (tallow)-to-vitamin-bearing oil being 10 to 14, 10 parts of gelatin and 6 parts of skim milk solids. There are also included 1% of customary anti-oxidant material based on the weight of the solids and 0.6% of sequestering agent based on the weight of the solids.

The homogenizate is spray-dried, as described in Example 1. The amount of the spray-dried product obtained is virtually the same as that of the total solids content of the homogenizate. The vitamin A content thereof is 84,000 units per gram. When subjected to accelerated holding tests, it was found that the vitamin A content is fully present at the end of 14 days.

*Example 3*

In accordance with the general procedure described in Example 1, a homogenizate is prepared from 50 parts of water
25 parts of a mixture of a fat having a melting point of 60° C. and a vitamin-bearing oil having a vitamin A content of 1.5 million units per gram
12.5 parts of gelatin
12.5 parts of milk solids not fat.

Also included are anti-oxidant and sequestering materials in the same percentages based on the solids, as described in Example 2. The homogenizate is diluted with water until the solids content of the homogenizate is 40%. This is then spray-dried in accordance with Example 1. The obtained product has a vitamin A content of 270,000 units per gram. It exhibits the high stability of the vitamin A on accelerated holding tests akin to those of the foregoing examples.

*Example 4*

In accordance with the general procedure described in Example 1, a homogenizate is prepared from 40 parts of water
25 parts of a vitamin-bearing oil (vegetable oil containing synthetic vitamin A) having a vitamin A content of one million units per gram
11 parts of fat having a melting point of 55–65° C.
24 parts of gelatin
12 parts of skim milk solids.

Anti-oxidant and sequestering materials in the same percentages, based on the solids, as described in Example 2, are also included in the homogenizate. The homogenizate is diluted with water to reduce the solids content thereof to 40% and then spray-dried, as described in Example 1.

The obtained product has a vitamin content of 250,000 units per gram. When subjected to accelerated holding tests, the product shows high vitamin A retention akin to that described in the foregoing examples.

*Example 5*

In accordance with the general procedure described in Example 1, a homogenizate is prepared from 16 parts of a vitamin-bearing oil having a vitamin A content of 600,000 units per gram
25 parts of a fat having a melting point of 55–65° C.
17.5 parts of gelatin
17.5 parts of skim milk solids.

Also included is the anti-oxidant material in the same percentage, based on the solids, as described in Example 1. The homogenizate is diluted with water to a solids concentration of 40% and is spray-dried in accordance with the procedure of Example 1. The product obtained has a vitamin A content of 96,000 units per gram; and shows on accelerated holding tests high vitamin A retention similar to that of the products above described.

*Example 6*

In accordance with the general procedure described in Example 1, a homogenizate is prepared from 20 parts of a vitamin-bearing oil having a vitamin A content of 600,000 units per gram
25 parts of a fat having a melting point of 55–65° C.
8 parts of gelatin and
17 parts of milk solids not fat.

There are also included 1% of customary anti-oxidant material and 0.6% of customary sequestering material, both based on the weight of the solids. The homogenizate is diluted with water to reduce the solids content thereof to 40% and then spray-dried, as described in Example 1. The vitamin A content thereof is 100,000 units per gram. On accelerated holding tests, it is found that the vitamin A content is completely retained at the end of 14 days.

*Example 7*

A homogenizate is prepared as described in Example 1 from 60 parts of water
10 parts of a vitamin-bearing oil having a vitamin A content of one million units per gram
15 parts of fat having a melting point of 55–65° C.
18 parts of gelatin
6 parts of milk solids not fat.

The homogenizate is spray-dried, as in Example 1. The vitamin A content thereof is 100,000 units per gram, showing that no loss of vitamin A occurred during processing. Accelerated holding tests show that the product possesses great stability of the vitamin A.

*Example 8*

A homogenizate is prepared, as described in Example 1, from 30 parts of water
15 parts of vitamin-bearing oil having a vitamin A content of 600,000 units per gram
10 parts of fat having a melting point of 55–65° C.
15 parts of gelatin
34 parts of skim milk solids.

The homogenizate is diluted with water to reduce the solids content thereof to 40% and spray-dried in accordance with the procedure described in Example 1. The product obtained has a vitamin A content of 90,000 units per gram and possesses outstanding stability of the vitamin A when subjected to accelerated holding tests.

It will be understood that the foregoing description of the invention and the examples set forth therein are merely illustrative of the principles thereof. Accordingly, the appended claims are to be construed as defining the invention within the full spirit and scope thereof.

I claim:

1. Method of manufacturing dry, powdered, fat-soluble vitamins in a stable form, which comprises mixing water, fat-soluble vitamin-bearing oil having a high concentration of said vitamin, edible fat which is a normally solid edible fat having a melting point ranging from about 35° to 75° C. and a non-fat vehicular material comprising a combination of gelatin and skim milk solids, homogenizing said mixture, and spray-drying said homogenizate.

2. Method of manufacturing dry, powdered vitamin A in a stable form, which comprises mixing water, vitamin A-bearing oil having a high concentration of vitamin A, edible fat which is a normally solid edible fat having a melting point ranging from about 35° to 75° C. and a non-fat vehicular material comprising a combination of gelatin and skim milk solids, homogenizing said mixture, and spray-drying said homogenizate.

3. Method of manufacturing dry, powdered, fat-soluble vitamins in a stable form, which comprises mixing water, fat-soluble vitamin-bearing oil having a high concentration of said vitamin, edible fat which is a normally solid edible fat having a melting point ranging from about 35° to 75° C. and a non-fat vehicular material comprising a combination of gelatin and skim milk solids, homogenizing said mixture and spray-drying said homogenizate, the water content of the mixture being 30–70% and the gelatin content of said vehicular material combination being 10–60% and the oil content, based on the total of the oil and the vehicular material combination, being 30–50%.

4. Method of manufacturing dry, powdered vitamin A in a stable form, which comprises mixing water, vitamin A-bearing oil having a high concentration of vitamin A, edible fat which is a normally solid edible fat having a melting point ranging from about 35° to 75° C. and a non-fat vehicular material comprising a combination of gelatin and skim milk solids, homogenizing said mixture and spray-drying said homogenizate, the water content of the mixture being 30–70% and the gelatin content of the vehicular material combination being 10–60% and the oil content, based on the total of the oil and the vehicular material combination, being 30–50%.

5. A dry, powdered, fat-soluble vitamin product comprising a high melting edible fat which is a normally solid edible fat having a melting point ranging from about 35° to 75° C. and containing a high concentration of fat-soluble vitamin material, in an amount of from 30 to 50%, imprisoned in a non-fat vehicular material combination in an amount of 70–50% said vehicular material comprising gelatin and skim milk solids, the gelatin constituting from 10–60% of said vehicular material combination.

6. A dry, powdered, fat-soluble vitamin product comprising an edible fat which is a normally solid edible fat having a melting point ranging from about 35° to 75° C. and containing a high concentration of fat-soluble vitamin material, in an amount of from 30 to 50%, imprisoned in a non-fat vehicular material combination, in an amount of 70–30%, said vehicular material comprising gelatin and skim milk solids, the gelatin constituting from 10–80% of the vehicular material combination, including anti-oxidant material in an amount up to 1.5% of the powder and sequestering material in an amount up to 0.8% of the powder.

7. A dry, powdered vitamin A product comprising an edible fat which is a normally solid edible fat having a melting point ranging from about 35° to 75° C. and containing vitamin A material, in an amount of 30–50% imprisoned in a non-fat vehicular material combination, in an amount of 50–70%, said vehicular material comprising gelatin and skim milk solids, the gelatin constituting from 10–60% of the vehicular combination.

8. A powder in accordance with claim 7, including anti-oxidant material in an amount up to 1.5% of the powder and sequestering material in an amount up to 0.8% of the powder.

References Cited in the file of this patent

UNITED STATES PATENTS

| | | |
|---|---|---|
| 1,879,762 | Nitardy | Sept. 27, 1932 |
| 2,218,591 | Taylor | Oct. 22, 1940 |
| 2,282,790 | Musher | May 12, 1942 |
| 2,650,895 | Wallenmeyer | Sept. 1, 1953 |
| 2,937,091 | Rosenberg | May 17, 1960 |
| 2,973,266 | Rosenberg | Feb. 28, 1961 |